(12) United States Patent
Yoneda et al.

(10) Patent No.: US 10,180,366 B2
(45) Date of Patent: Jan. 15, 2019

(54) TORQUE DETECTION DEVICE

(71) Applicant: KABUSHIKI KAISHA HONDA LOCK, Miyazaki-shi, Miyazaki (JP)

(72) Inventors: Toshihiro Yoneda, Miyazaki (JP); Kenjirou Matsumoto, Miyazaki (JP)

(73) Assignee: Kabushiki Kaisha Honda Lock, Miyazaki (JP)

(*) Notice: Subject to any disclaimer, the term of this patent is extended or adjusted under 35 U.S.C. 154(b) by 0 days.

(21) Appl. No.: 15/565,554

(22) PCT Filed: Apr. 22, 2016

(86) PCT No.: PCT/JP2016/062706
§ 371 (c)(1),
(2) Date: Oct. 10, 2017

(87) PCT Pub. No.: WO2016/175138
PCT Pub. Date: Nov. 3, 2016

(65) Prior Publication Data
US 2018/0120175 A1 May 3, 2018

(30) Foreign Application Priority Data
Apr. 27, 2015 (JP) ................. 2015-090189

(51) Int. Cl.
*G01L 3/10* (2006.01)
*B62D 6/10* (2006.01)
(Continued)

(52) U.S. Cl.
CPC ............. *G01L 3/101* (2013.01); *B62D 6/10* (2013.01); *G01L 3/104* (2013.01); *G01L 3/109* (2013.01);
(Continued)

(58) Field of Classification Search
CPC . G01L 5/161; G01L 5/20; G01L 5/221; G01L 3/1457; G01L 3/108; G01L 3/101; G01L 3/104; G01L 3/109; G01L 1/22; G01L 1/2231; G01L 1/2206; B62D 6/10; B62D 5/04

USPC ........ 73/862.338, 862.321, 862.08, 862.621, 73/862.632, 862.637, 862.331–862.336
See application file for complete search history.

(56) References Cited

U.S. PATENT DOCUMENTS 6,707,182 B2 * 3/2004 Yamanaka ........... B62D 5/0403
180/444
8,561,481 B2 10/2013 Bae et al.
(Continued)

FOREIGN PATENT DOCUMENTS

JP 2010-539472 A 12/2010
JP 2013-524207 A 6/2013
(Continued)

OTHER PUBLICATIONS

Official Communication issued over the corresponding Japanese Patent Application 2015-090189 dated Nov. 8, 2017.

*Primary Examiner* — Jonathan Dunlap
(74) *Attorney, Agent, or Firm* — Carrier Blackman & Associates, P.C.; Joseph P. Carrier; Fulchand P. Shende

(57) ABSTRACT

A torque detection device including a multipolar ring-shaped magnet fixed to a first shaft, a yoke holder configured to be fixed to a second shaft coaxially linked to the first shaft via a torsion bar and have a cylindrical portion surrounding the magnet, a pair of magnetic yokes each having a plurality of claw portions opposing the magnet and are fixed to the yoke holder, and a sensor part that detects a difference in rotational phase between the first shaft and the second shaft, wherein the pair of magnetic yokes are each provided with a plurality of swaging pieces swaged on the cylindrical portion, the swaging piece disposed at a position that overlaps in a radial direction of the cylindrical portion a specific claw portion selected from the plurality of claw portions and being formed so as to have a smaller width than a width of the claw portion.

4 Claims, 11 Drawing Sheets

(51) Int. Cl.
  *G01L 5/22*    (2006.01)
  *G01L 5/16*    (2006.01)
  *G01L 1/22*    (2006.01)
  *G01L 3/14*    (2006.01)
  *G01L 5/20*    (2006.01)
  *B62D 5/04*    (2006.01)

(52) U.S. Cl.
  CPC ............... *G01L 5/221* (2013.01); *B62D 5/04* (2013.01); *G01L 1/22* (2013.01); *G01L 1/2206* (2013.01); *G01L 1/2231* (2013.01); *G01L 3/108* (2013.01); *G01L 3/1457* (2013.01); *G01L 5/161* (2013.01); *G01L 5/20* (2013.01)

(56) References Cited

U.S. PATENT DOCUMENTS

| | | | |
|---|---|---|---|
| 8,901,922 B2* | 12/2014 | Hamaguchi | G01D 5/145 |
| | | | 324/207.25 |
| 9,018,945 B2* | 4/2015 | Muto | G01L 3/104 |
| | | | 324/207.2 |
| 9,434,410 B2 | 9/2016 | Lee | |
| 9,459,165 B2* | 10/2016 | Hama | G01L 5/221 |
| 10,060,808 B2* | 8/2018 | Toyama | G01R 33/0011 |
| 2003/0136604 A1* | 7/2003 | Yamanaka | B62D 5/0403 |
| | | | 180/444 |
| 2007/0157740 A1 | 7/2007 | Jerems et al. | |
| 2013/0063136 A1* | 3/2013 | Hamaguchi | G01L 3/104 |
| | | | 324/207.25 |
| 2013/0093414 A1* | 4/2013 | Muto | G01L 3/104 |
| | | | 324/207.25 |
| 2015/0276519 A1* | 10/2015 | Hama | G01L 5/221 |
| | | | 73/862.193 |
| 2017/0315004 A1* | 11/2017 | Toyama | G01L 3/104 |

FOREIGN PATENT DOCUMENTS

JP    2013-195333 A    9/2013
JP    2015-184220 A    10/2015

* cited by examiner

FIG.11
(a)
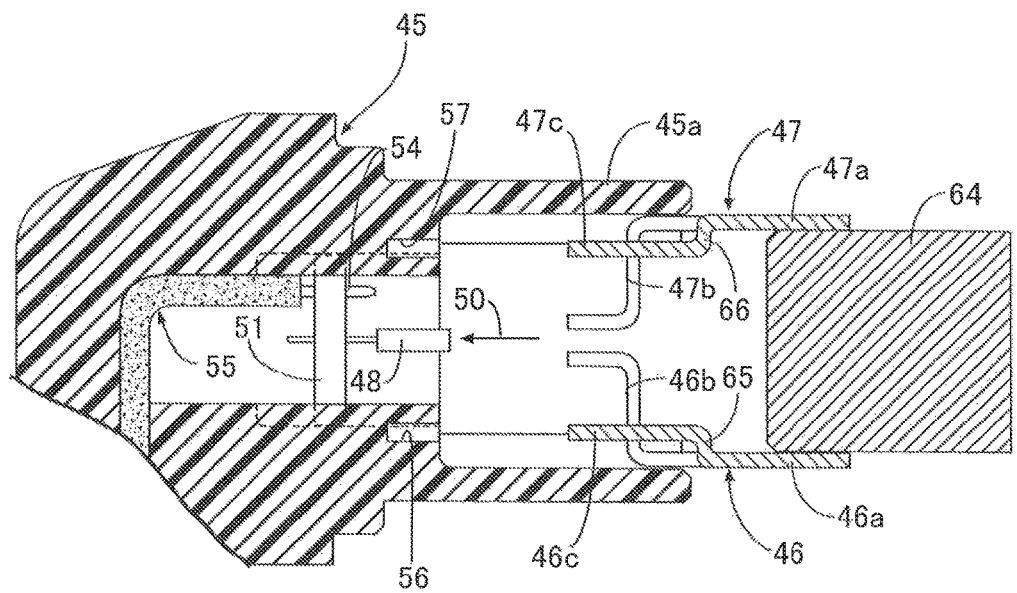
(b)
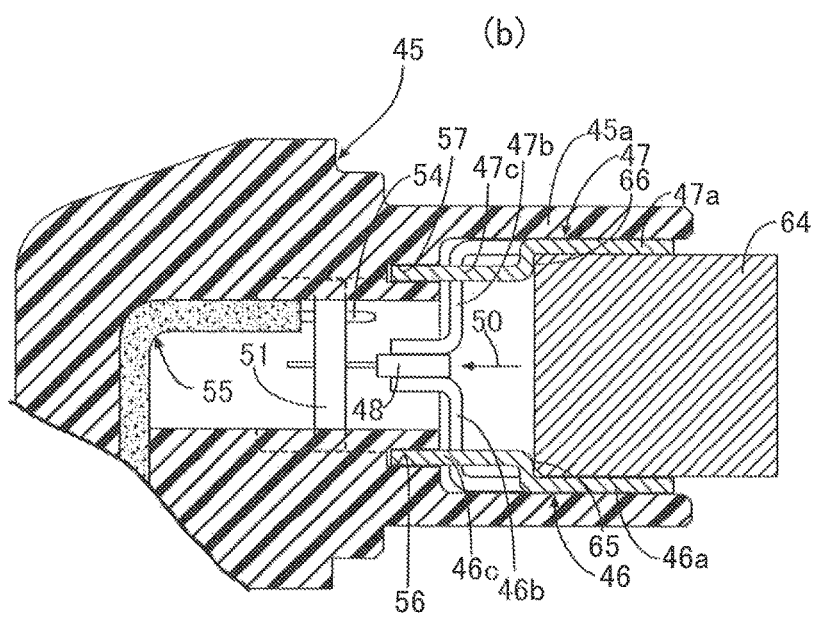

TORQUE DETECTION DEVICE

TECHNICAL FIELD

The present invention relates to a torque detection device that includes a multipolar magnet that is formed into a ring shape and fixed to a first shaft, a yoke holder that is formed so as to be fixed to a second shaft coaxially linked to the first shaft via a torsion bar and have a cylindrical portion surrounding the magnet, a pair of magnetic yokes that each have a plurality of claw portions opposing the magnet on an inner side of the cylindrical portion and are fixed to the yoke holder, and a sensor part that detects a difference in rotational phase between the first shaft and the second shaft.

BACKGROUND ART

A torque detection device for use in a vehicle power steering device is known from Patent Document 1.

RELATED ART DOCUMENTS

Patent Documents

Patent Document 1: Japanese Patent Application Laid-open No. 2013-195333

SUMMARY OF THE INVENTION

Problems to be Solved by the Invention

When a pair of magnetic yokes are fixed to a yoke holder, swaging part of the magnetic yoke so as to fix it to the yoke holder could be considered, but it is necessary to prevent a claw portion of the magnetic yoke from being undesirably deformed when carrying out swaging.

The present invention has been accomplished in light of such circumstances, and it is an object thereof to provide a torque detection device that prevents undesirable deformation from occurring in a claw portion of a magnetic yoke when fixing the magnetic yoke to a yoke holder by swaging.

Means for Solving the Problems

In order to attain the above object, according to a first aspect of the present invention, there is provided a torque detection device comprising a multipolar magnet that is formed into a ring shape and fixed to a first shaft, a yoke holder that is formed so as to be fixed to a second shaft coaxially linked to the first shaft via a torsion bar and have a cylindrical portion surrounding the magnet, a pair of magnetic yokes that each have a plurality of claw portions opposing the magnet on an inner side of the cylindrical portion and are fixed to the yoke holder, and a sensor part that detects a difference in rotational phase between the first shaft and the second shaft, characterized in that the pair of magnetic yokes are each provided with a plurality of swaging pieces swaged on an outer periphery of the cylindrical portion, the swaging piece being disposed at a position that overlaps in a radial direction of the cylindrical portion a specific claw portion selected from the plurality of claw portions and being formed so as to have a smaller width than a width of the claw portion.

Further, according to a second aspect of the present invention, in addition to the first aspect, the swaging piece is disposed so as to make the center position along a peripheral direction of the cylindrical portion coincide with the specific claw portion.

Furthermore, according to a third aspect of the present invention, in addition to the first or second aspect, the claw portions of the pair of magnetic yokes are disposed in turn in the peripheral direction of the cylindrical portion, and the claw portions that are adjacent to each other and form a pair in the peripheral direction of the cylindrical portion are disposed at positions where the claw portions can be swaged simultaneously by means of the same swaging blade.

Effects of the Invention

In accordance with the first aspect of the present invention, since the plurality of swaging pieces that are swaged on the outer periphery of the cylindrical portion of the yoke holder are provided on each of the pair of magnetic yokes, it is possible, by receiving the claw portions on the inner peripheral side of the yoke holder by means of a receiving tool when swaging the swaging pieces, to prevent the claw portions from deforming.

Furthermore, in accordance with the second aspect of the present invention, since the center position of the swaging piece along the peripheral direction of the cylindrical portion of the yoke holder coincides with the center position of the claw portion corresponding to the swaging piece, it is possible to minimize the stress acting on a portion, free from the claw portions in the peripheral direction, of the magnetic yokes when carrying out swaging, thus preventing the portion from deforming.

Moreover, in accordance with the third aspect of the present invention, of the pluralities of swaging pieces the claw portions that are adjacent to each other and form a pair in the peripheral direction of the cylindrical portion can be swaged simultaneously by means of the same swaging blade, thereby enhancing the productivity.

BRIEF DESCRIPTION OF DRAWINGS

FIG. 11 is a vertical sectional view showing in sequence states via which the magnetism-collecting terminal is press fitted into a case when viewed from the same direction as in FIG. 1. (first embodiment)

EXPLANATION OF REFERENCE NUMERALS AND SYMBOLS

Figure 1:
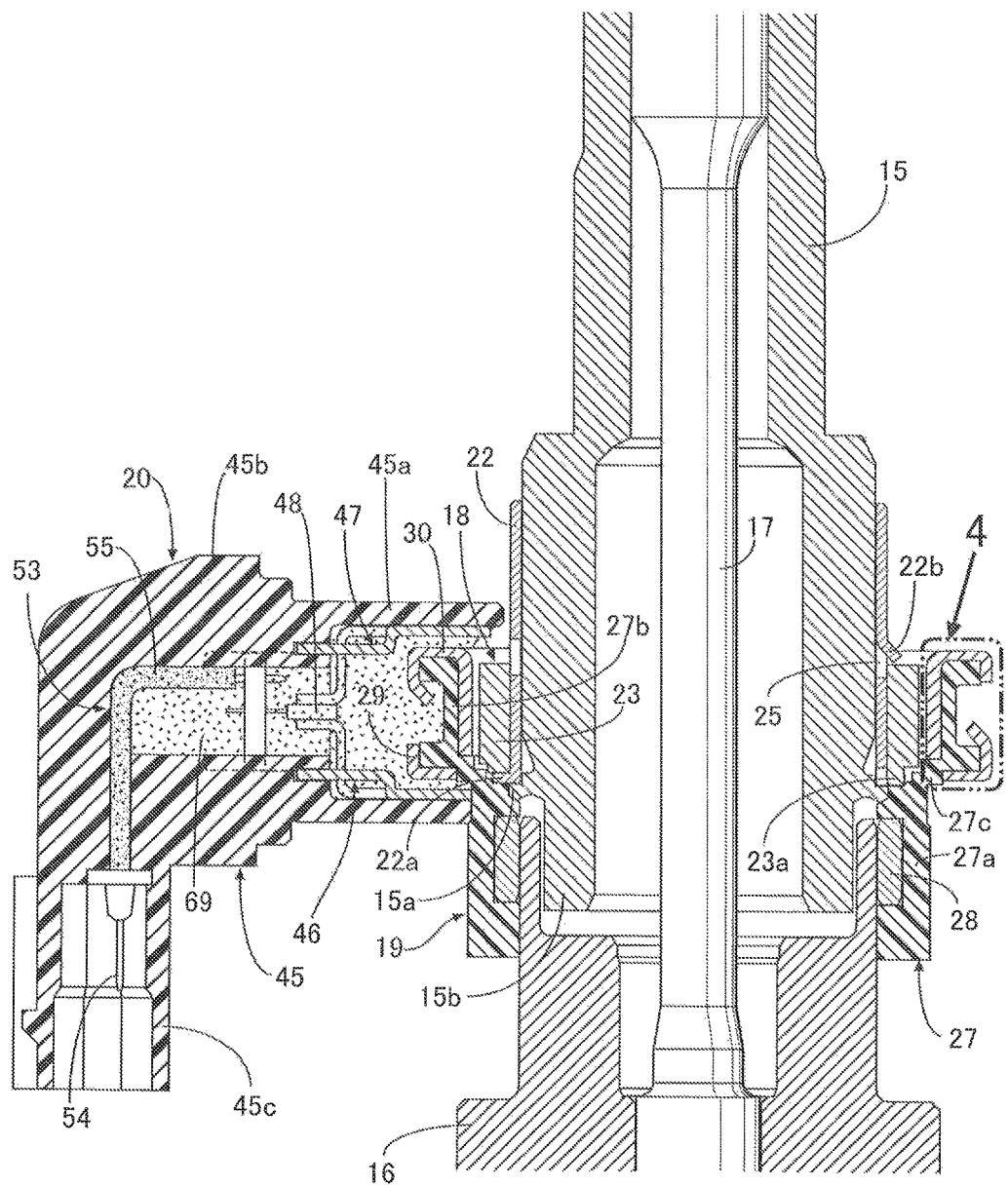
FIG. 1 is a vertical sectional view of a first shaft, a second shaft, a torsion bar and a torque detection device. (first embodiment)

15 First shaft
16 Second shaft
17 Torsion bar
23 Magnet
27 Yoke holder
27b Cylindrical portion
29, 30 Magnetic yoke
29a, 30a Claw portion
29c, 30c Swaging piece
20 Sensor part
40 Swaging blade

Modes for Carrying Out the Invention

An embodiment of the present invention is explained below by reference to the attached FIG. 1 to FIG. 11.

First Embodiment

First, in FIG. 1, in an electric power steering device, a torque detection device is provided on an intermediate part of a steering shaft, the torque detection device being formed in accordance with the present invention so as to detect a twist between a first shaft 15 and second shaft 16 that are linked by means of a torsion bar 17.

An end part, on the second shaft 16 side, of the first shaft 15 and an end part, on the first shaft 15 side, of the second shaft 16 are each formed into a cylindrical shape; the first shaft 15 is provided with a collar portion 15a protruding radially outward from the outer periphery of an intermediate part, close to the second shaft 16, of the first shaft 15, and a small diameter cylindrical portion 15b that has a smaller external diameter than a portion on the side opposite to the second shaft 16 with respect to the collar portion 15a and is disposed in a portion further toward the second shaft 16 side than the collar portion 15a. Furthermore, a portion, on the first shaft 15 side, of the second shaft 16 is disposed so as to surround the small diameter cylindrical portion 15b of the first shaft 15.

Figure 2:
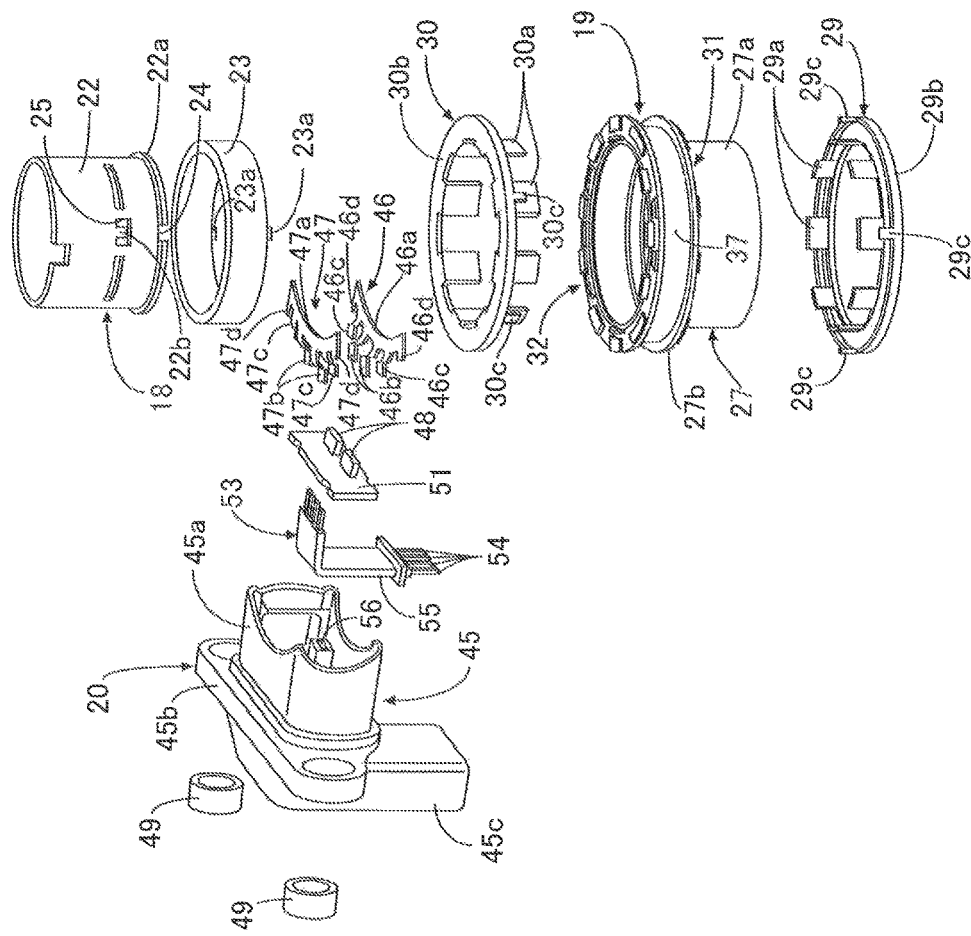
FIG. 2 is an exploded perspective view of the torque detection device. (first embodiment)

Referring in addition to FIG. 2, the torque detection device includes a magnet part 18 fixed to the first shaft 15, a stator part 19 fixed to the second shaft 16, and a sensor part 20 that detects a difference in rotational phase between the first shaft 15 and the second shaft 16, that is, a difference in rotational phase between the magnet part 18 and the stator part 19.

Figure 3:
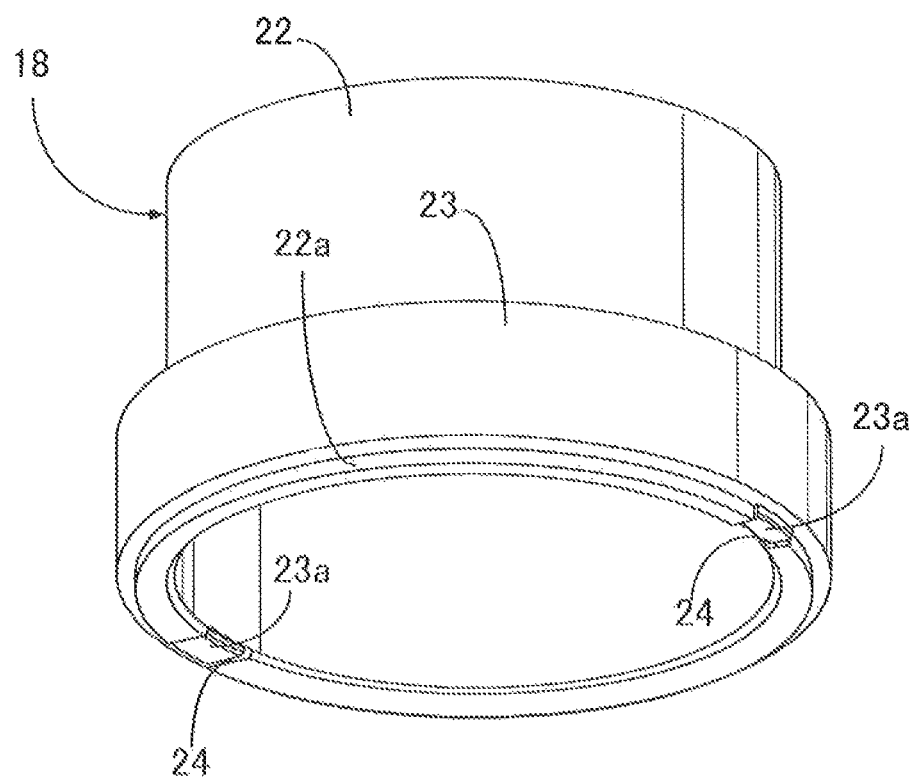
FIG. 3 is a perspective view of a magnet part. (first embodiment)

Referring in addition to FIG. 3, the magnet part 18 includes a magnet holder 22 formed into a cylindrical shape from a metal and fixed to the first shaft 15 by press fitting, and a magnet 23 formed into a ring shape surrounding the magnet holder 22 and fixed to the magnet holder 22, the magnet 23 being a multi-pole magnet and having a plurality, for example eight, of each of N poles and S poles disposed in turn in the peripheral direction.

A radially outward protruding flange portion 22a is provided integrally with one end part of the magnet holder 22, and this magnet holder 22 is press fitted onto the first shaft 15 so that the flange portion 22a abuts against the collar portion 15a of the first shaft 15. The magnet 23 is adhered to the outer periphery of the magnet holder 22 by means of an adhesive so that one end part of the magnet 23 abuts against the flange portion 22a.

Moreover, a positioning recess part 24 is formed at for example two locations along the peripheral direction of the flange portion 22a, and a positioning projection 23a is projectingly provided on the one end part of the magnet 23, the positioning projection 23a engaging with the positioning recess part 24. Furthermore, a substantially U-shaped cutout 25 opening on the side opposite to the flange portion 22a is formed at for example one location in the peripheral direction of the magnet holder 22 so that a cut-and-raise piece 22b can be cut and raised, the cut-and-raise piece 22b being capable of abutting, from the side opposite to the flange portion 22a, against the magnet 23 adhered to the outer periphery of the magnet holder 22.

Figure 4:
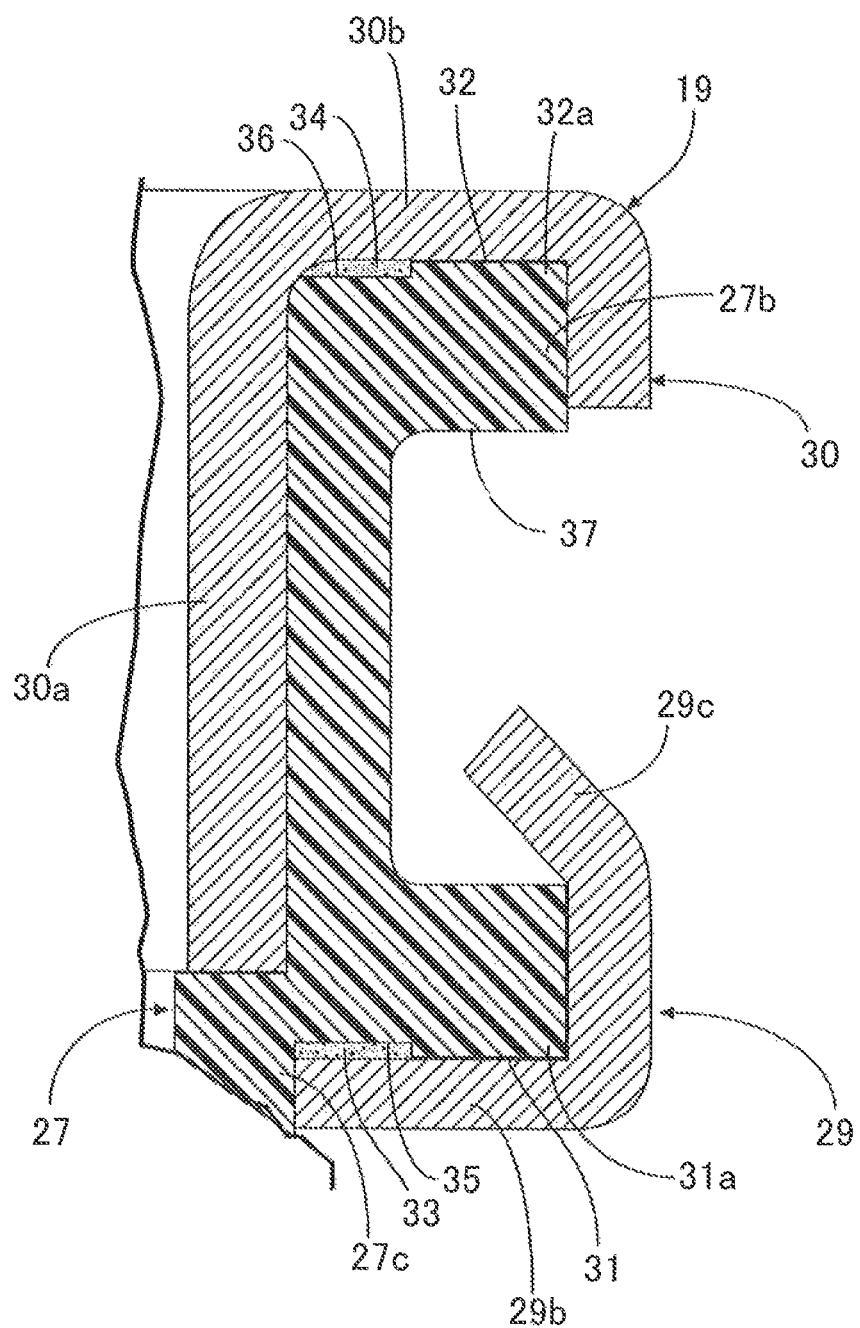
FIG. 4 is an enlarged view of part shown by arrow 4 in FIG. 1. (first embodiment)
Figure 5:
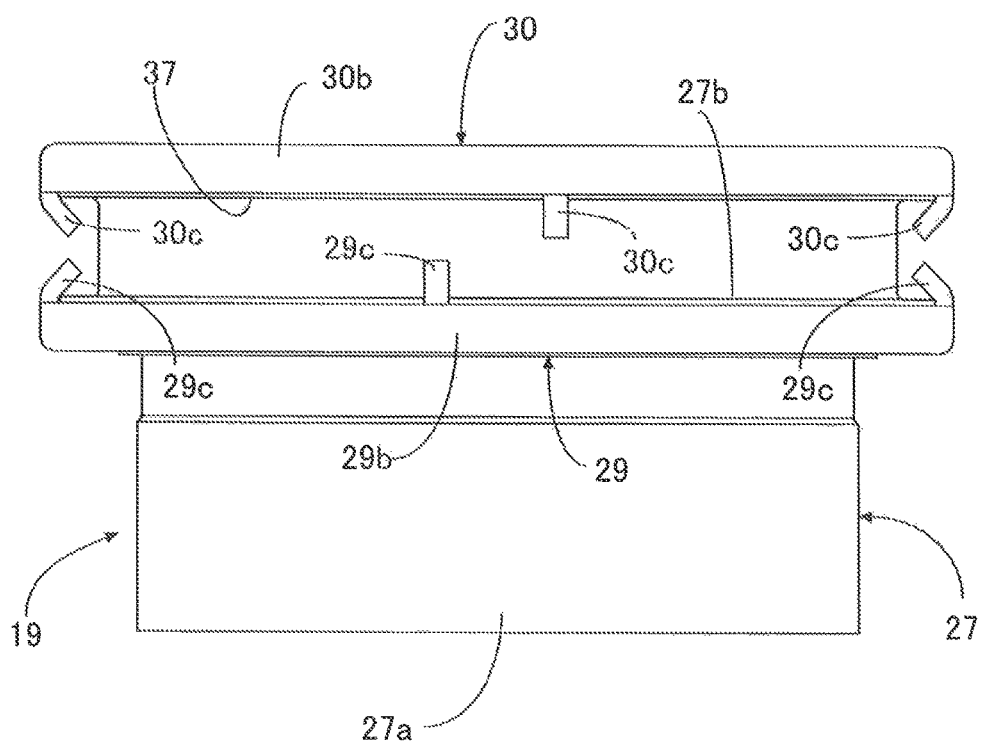
FIG. 5 is a side view of a stator part. (first embodiment)
Figure 6:
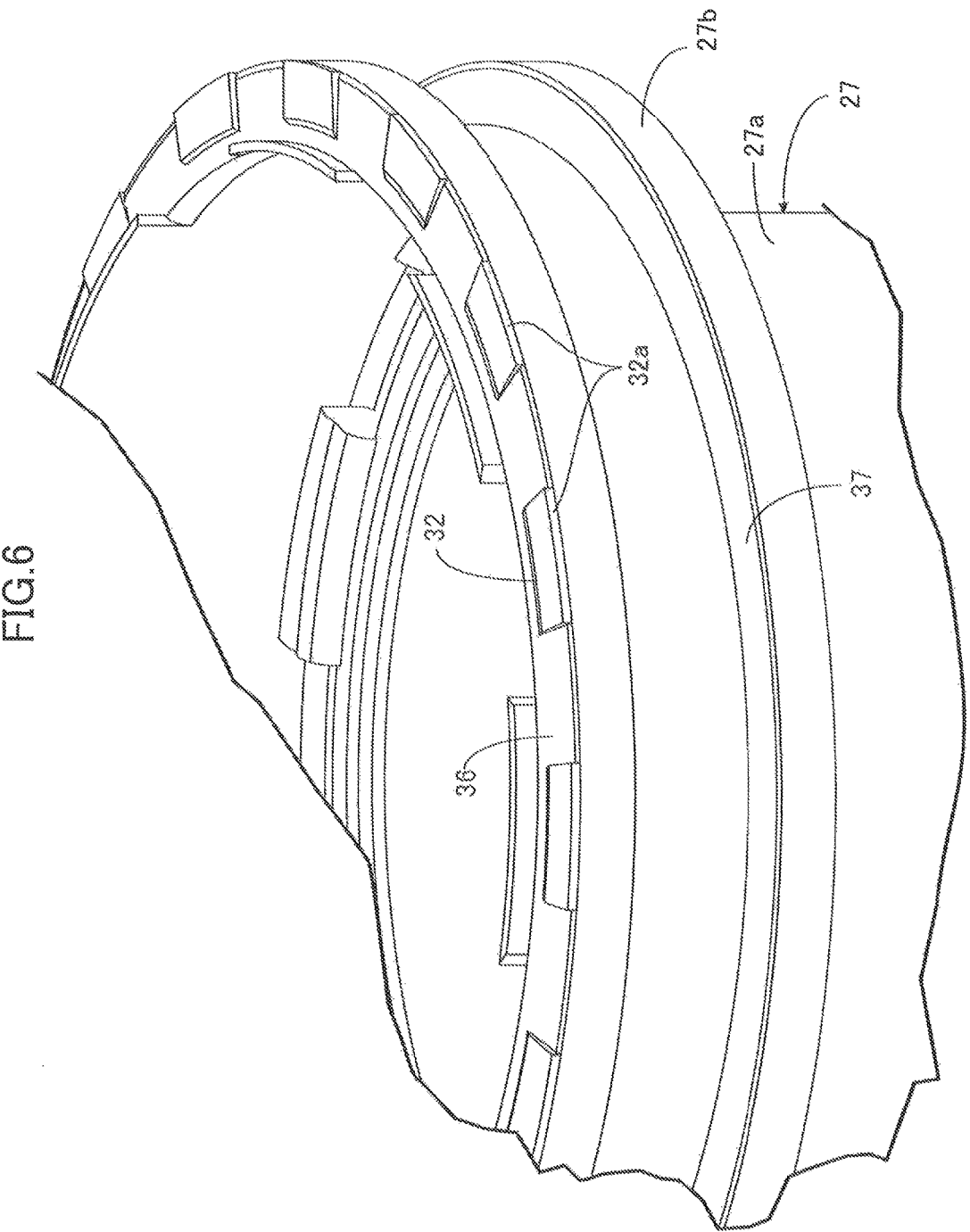
FIG. 6 is a perspective view of a yoke holder. (first embodiment)

Referring in addition to FIG. 4 to FIG. 6, the stator part 19 includes a yoke holder 27 formed from a synthetic resin, a collar 28 formed into a ring shape from a metal and mold-bonded to the yoke holder 27, and first and second magnetic yokes 29 and 30 fixed to the yoke holder 27.

The yoke holder 27 is formed so as to integrally have a first cylindrical portion 27a surrounding an end part, on the first shaft 15 side, of the second shaft 16, a second cylindrical portion 27b formed so as to have a larger diameter than that of the first cylindrical portion 27a and surrounding the magnet 23, and a ring-shaped linking portion 27c providing a link between the first and second cylindrical portions 27a and 27b, the collar 28 being mold-bonded to the inner periphery of the first cylindrical portion 27a, and the collar 28 being press fitted around the outer periphery of the end part, on the first shaft 15 side, of the second shaft 16.

The first magnetic yoke 29 is formed so as to integrally have a plurality of, for example eight, claw portions 29a disposed so as to oppose the outer periphery of the magnet 23 while being disposed on the inner peripheral side of the second cylindrical portion 27b, and a ring plate portion 29b provided on the inner periphery so as to be connected at right angles at a plurality of locations, for example eight locations, where the claw portions 29a are equally spaced in the peripheral direction. The second magnetic yoke 30 is formed so as to integrally have a plurality of, for example eight, claw portions 30a disposed so as to oppose the outer periphery of the magnet 23 while being disposed on the inner peripheral side of the second cylindrical portion 27b, and a ring plate portion 30b provided on the inner periphery so as to be connected at right angles at a plurality of locations, for example eight locations, where the claw portions 30a are equally spaced in the peripheral direction.

The ring plate portion 29b of the first magnetic yoke 29 is adhered by means of an adhesive 33 to a ring-shaped first joining face 31 formed on one end of the second cylindrical portion 27b of the yoke holder 27, and the ring plate portion 30b of the second magnetic yoke 30 is adhered by means of an adhesive 34 to a ring-shaped second joining face 32 formed on the other end of the second cylindrical portion 27b of the yoke holder 27.

In a state in which the first and second magnetic yokes 29 and 30 are fixed to the second cylindrical portion 27b of the yoke holder 27, the claw portion 29a of the first magnetic yoke 29 and the claw portion 30a of the second magnetic yoke 30 are disposed in turn in the peripheral direction, and the total number of claw portions 29a and 30a is set so as to correspond to the total number of N poles and S poles of the magnet 23.

The ring-shaped second joining face 32 provided on the second cylindrical portion 27b of the yoke holder 27 so that the ring plate portion 30b of the second magnetic yoke 30 is adhered thereto has a recess part 36 formed therein as is clearly shown in FIG. 6, and in this embodiment the recess part 36 is formed so that the recess part 36 forms a plurality of projecting portions 32a disposed on a portion close to the outer periphery of the second joining face 32 at intervals in the peripheral direction. The ring-shaped first joining face 31 provided on the second cylindrical portion 27b of the yoke holder 27 so that the ring plate portion 29b of the first magnetic yoke 29 is adhered thereto has formed therein a recess part 35 similar to the recess part 36, and this recess part 35 is formed so that the recess part 35 forms a plurality of projecting portions 31a on a portion close to the outer periphery of the first joining face 31 at intervals in the peripheral direction.

The adhesives 33 and 34 can be accumulated in the recess part 35 of the first joining face 31 and the recess part 36 of the second joining face 32 as is clearly shown in FIG. 4.

The first and second magnetic yokes 29 and 30 are adhered to the second cylindrical portion 27b of the yoke holder 27 and fixed to the outer periphery of the second cylindrical portion 27b by swaging, and a plurality, for example four, of each of swaging pieces 29c and 30c that are swaged so as to engage with a latching groove 37 provided in an intermediate part in the axial direction of the outer periphery of the second cylindrical portion 27b are provided integrally with the first and second magnetic yokes 29 and 30 so as to be connected to the outer periphery of the ring plate portions 29b and 30b at right angles and extend along the outer periphery of the second cylindrical portion 27b.

The swaging piece 29c of the first magnetic yoke 29 is disposed at a position where it overlaps a specific claw portion 29a, selected from the claw portions 29a of the first magnetic yoke 29, in the radial direction of the second cylindrical portion 27b, and in this embodiment four swaging pieces 29c having a smaller width than that of the claw portion 29a are disposed so as to make the center position along the peripheral direction of the second cylindrical portion 27b coincide with four specific claw portions 29a equally spaced from each other.

Furthermore, the swaging piece 30c of the second magnetic yoke 30 is disposed at a position where it overlaps a specific claw portion 30a, selected from the claw portions 30a of the second magnetic yoke 30, in the radial direction of the second cylindrical portion 27b, and in this embodiment four swaging pieces 30c having a smaller width than that of the claw portion 30a are disposed so as to make the center position along the peripheral direction of the second cylindrical portion 27b coincide with four specific claw portions 30a equally spaced from each other.

Since the swaging pieces 29c of the first magnetic yoke 29 are disposed at positions where they overlap four equally spaced specific claw portions 29a of the eight claw portions 29a in the radial direction of the second cylindrical portion 27b, and the swaging pieces 30c of the second magnetic yoke 30 are disposed at positions where they overlap four equally spaced specific claw portions 30a of the eight claw portions 30a, disposed in turn with the claw portions 29a in the peripheral direction, in the radial direction of the second cylindrical portion 27b, four of each of the swaging pieces 29c and 30c are disposed in turn in the peripheral direction of the second cylindrical portion 27b.

Figure 7:
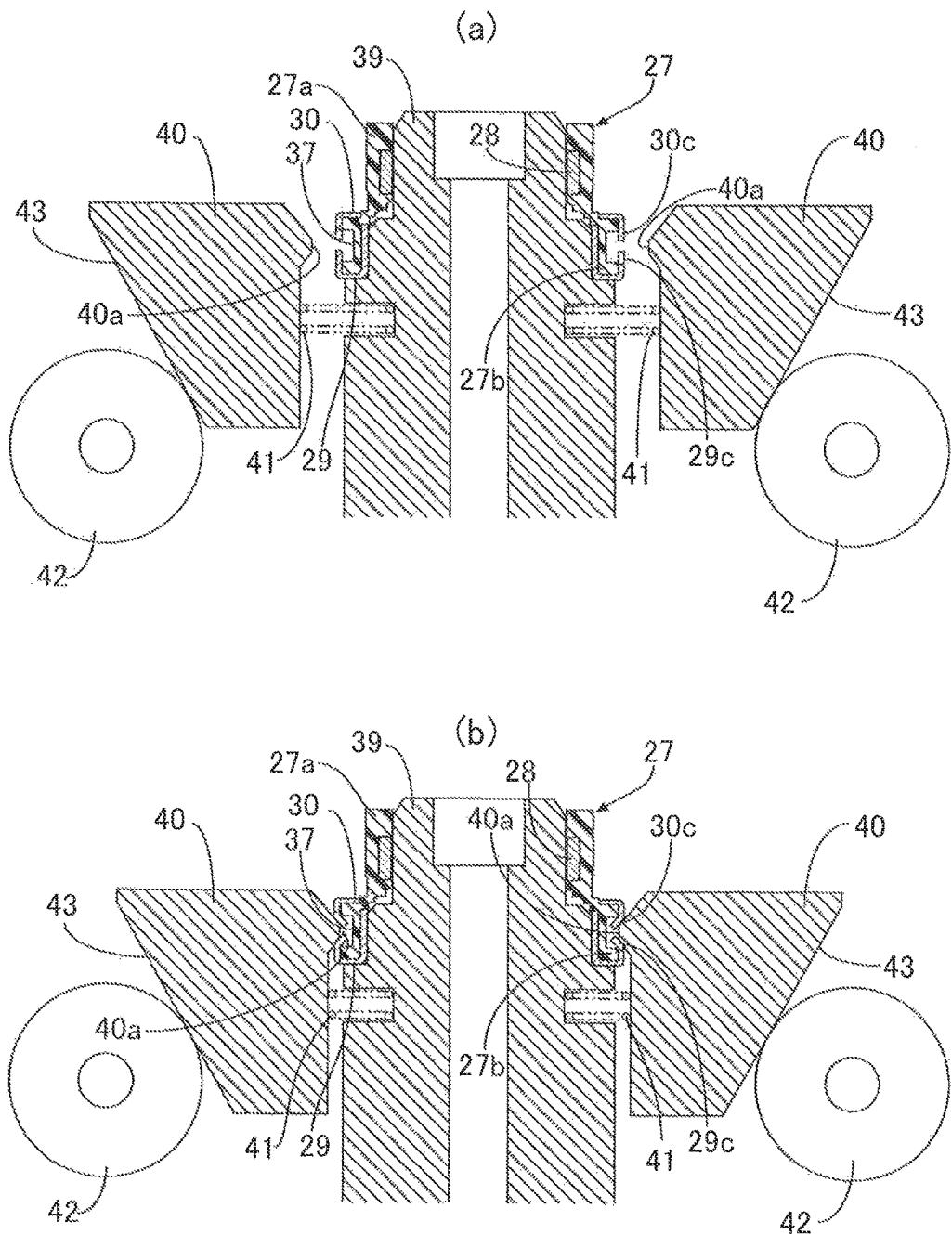
FIG. 7 is a vertical sectional view showing in sequence states via which a magnetic yoke is fixed to the yoke holder by swaging. (first embodiment)

In FIG. 7, when fixing the first and second magnetic yokes 29 and 30 to the yoke holder 27 by means of swaging, a swaging device is used that includes a receiving jig 39 that is fitted within the yoke holder 27 and receives the yoke holder 27, a plurality of swaging blades 40 that are disposed on the outside of the second cylindrical portion 27b of the yoke holder 27, a return spring 41 that is provided between the receiving jig 39 and the swaging blade 40, and a pressure roller 42 that is driven in the axial direction of the yoke holder 27 by means of a cylinder (not illustrated), etc. while making contact with an inclined cam face 43 formed on an outside face of the swaging blade 40 on the side opposite to the yoke holder 27.

The swaging pieces 29c and 30c of the first and second magnetic yokes 29 and 30 are disposed in turn in the peripheral direction of the second cylindrical portion 27b, and swaging pieces 29c and 30c that are adjacent to each other and form a pair in the peripheral direction of the second cylindrical portion 27b are disposed at positions where they can be swaged simultaneously by means of the same swaging blade 40.

Therefore, in the swaging device, the swaging blades 40 are disposed at four locations equally spaced in the peripheral direction of the second cylindrical portion 27b so as to correspond to the four pairs of swaging pieces 29c and 30c, and a pressure swaging portion 40a on a portion of the swaging blade 40 corresponding to the latching groove 37 of the second cylindrical portion 27b is formed so that it can swage simultaneously the swaging pieces 29c and 30c that are adjacent to each other and form a pair in the peripheral direction of the second cylindrical portion 27b.

In a state in which the yoke holder 27 with the first and second magnetic yokes 29 and 30 adhered thereto is supported by the receiving jig 39, moving the pressure roller 42 from the position of FIG. 7(a) to the position of FIG. 7(b) makes each swaging blade 40 move forward toward the yoke holder 27 side against the spring force of the return spring 41, thereby simultaneously swaging the swaging pieces 29c and 30c that are adjacent to each other in the peripheral direction of the second cylindrical portion 27b so that the pressure swaging portion 40a of the swaging blade 40 engages with the latching groove 37.

Figure 8:
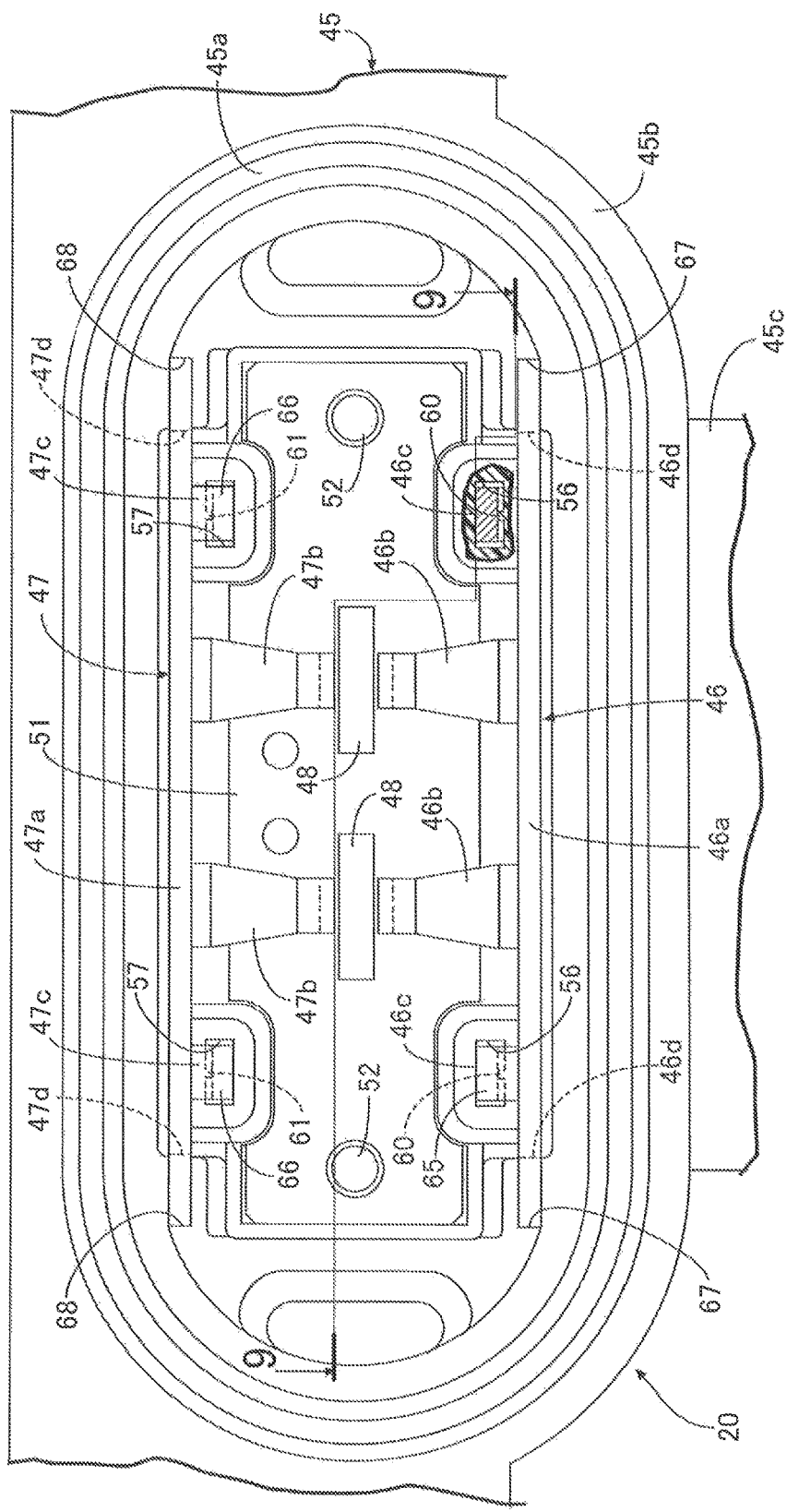
FIG. 8 is a front view of a sensor part when viewed from the stator part side. (first embodiment)
Figure 9:
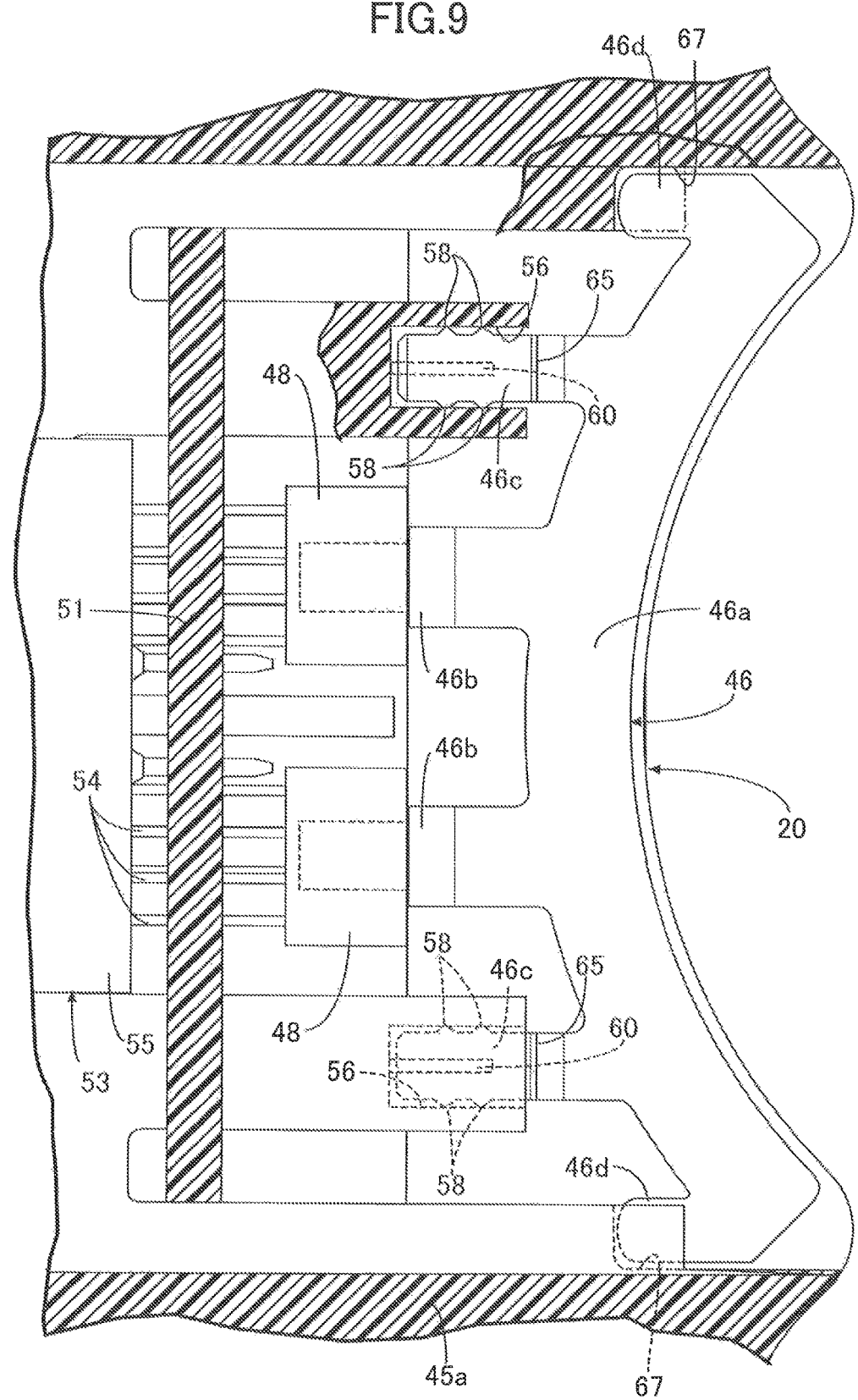
FIG. 9 is a sectional view along line 9-9 in FIG. 8. (first embodiment)

Referring in addition to FIG. 8 and FIG. 9, the sensor part 20 includes a synthetic resin case 45 at a position that is fixed with respect to the first shaft 15 and the second shaft 16, first and second magnetism-collecting terminals 46 and 47 made of a metal and press fitted into the case 45 so as to individually correspond to the first and second magnetic yokes 29 and 30, and a Hall IC 48 as a magnetism-detecting element disposed between the first and second magnetism-collecting terminals 46 and 47.

The case 45 is fixedly disposed radially outside the stator part 19, and is formed so as to integrally have a case main portion 45a that is formed into a tubular shape having an elliptical cross-section that is long in a direction orthogonal to the axis of the first shaft 15 and the second shaft 16 while having its extremity opening on the stator part 19 side, a mounting collar portion 45b protruding sideways from a base end of the case main portion 45a, and a connector portion 45c extending in a direction along the axis of the first shaft 15 and the second shaft 16 and connected to a base end part of the case main portion 45a at right angles. Furthermore, a pair of cylindrical collars 49 (see FIG. 2) are mold bonded to the mounting collar portion 45b, bolts for fastening the case 45 to the vehicle body side being inserted through the collars 49.

Figure 10:
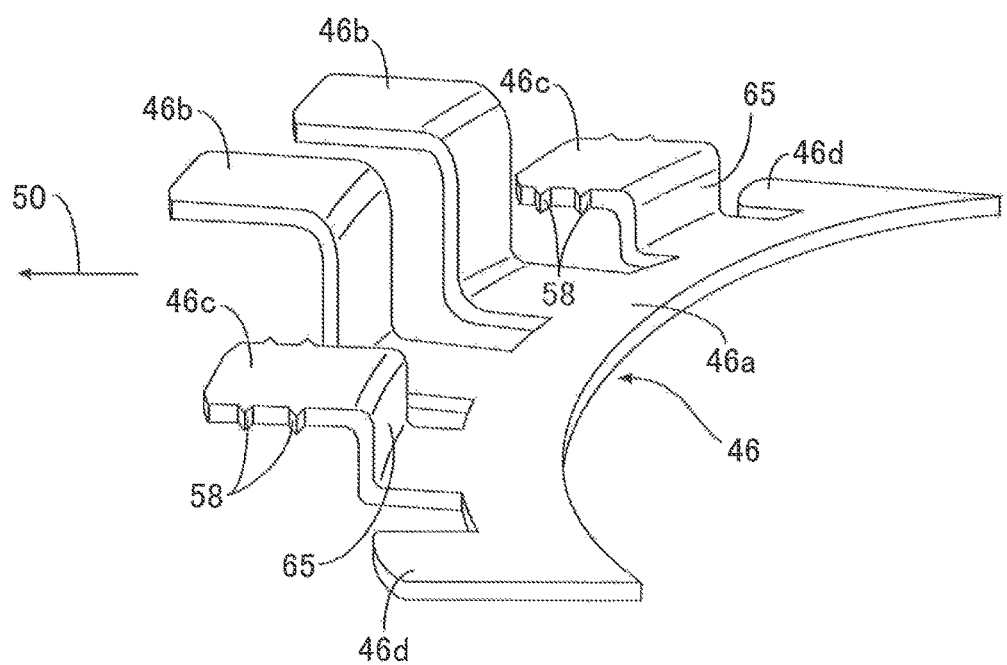
FIG. 10 is a perspective view of a magnetism-collecting terminal. (first embodiment)

In FIG. 10, the first magnetism-collecting terminal 46 is formed so as to integrally have an arc plate portion 46a formed into an arc shape opposing the ring plate portion 29b of the first magnetic yoke 29 from the outside in the axial direction of the first shaft 15 and the second shaft 16, a pair of magnetism-collecting pieces 46b arranged parallel to each other and projecting outward from a middle part in the peripheral direction of the arc plate portion 46a, a pair of press fitting pieces 46c connected to the arc plate portion 46a on opposite sides in the peripheral direction of the magnetism-collecting pieces 46b and projecting outward while being parallel to the magnetism-collecting pieces 46b, and a pair of guide pieces 46d projecting outward from opposite ends in the peripheral direction of the arc plate portion 46a while being parallel to the magnetism-collecting pieces 46b and the press fitting pieces 46c.

The first magnetism-collecting terminal 46 is fixed to the case main portion 45a of the case 45 by press fitting. The magnetism-collecting piece 46b, the press fitting piece 46c, and the guide piece 46d are connectedly provided integrally with the arc plate portion 46a so as to extend in parallel along a press fitting direction 50 in which the first magnetism-collecting terminal 46 is press fitted into the case main portion 45a.

The second magnetism-collecting terminal 47 is formed so as to have a shape that is symmetrical with that of the first magnetism-collecting terminal 46 with respect to a plane orthogonal to the axial direction of the first and second shafts 15 and 16, and is formed so as to integrally have an arc plate portion 47a, a pair of magnetism-collecting pieces 47b, a pair of press fitting pieces 47c, and a pair of guide pieces 47d.

An IC board 51 is disposed in a part deep within the case portion 45a so that a pair of supporting projecting parts 52 provided integrally with the case main portion 45a are inserted through the IC board 51, and melting part of the supporting projecting part 52 fixes the IC board 51 to the case main portion 45a. A pair of the Hall elements 48 are disposed on the IC board 51.

A bus bar unit 53 is mold bonded to the case 45 so as to extend between the case main portion 45a and the connector portion 45c, the bus bar unit 53 being formed by molding to a synthetic resin bus bar holder 55 a plurality of bus bars 54 having one end part disposed within the connector portion 45c and the other end part connected to the IC board 51.

The pair of Hall ICs 48 are disposed between the extremities of the pair of magnetism-collecting pieces 46b of the first magnetism-collecting terminal 46 and the extremities of the pair of magnetism-collecting pieces 47b of the second magnetism-collecting terminal 47, and the magnetism-collecting pieces 46b and 47b of the first and second magnetism-collecting terminals 46 and 47 are formed by bending their extremities so as to become closer to each other in a state in which the first and second magnetism-collecting terminals 46 and 47 are press fitted into and fixed to the case 45.

Two pairs of press fitting holes 56 and 57 are provided in the case main portion 45a of the case 45, the press fitting holes 56 and 57 being for press fitting the pair of press fitting pieces 46c of the first magnetism-collecting terminal 46 and the pair of press fitting pieces 47c of the second magnetism-collecting terminal 47. A plurality of engagement claws 58 are provided integrally with the press fitting piece 46c, the engagement claws 58 engaging with an inner face of the press fitting hole 56 into which the press fitting piece 46c is press fitted, and in this embodiment a plurality of engagement claws 58 are provided on each of opposite sides in the width direction of the press fitting piece 46c. Furthermore, a plurality of engagement claws, which are not illustrated, engaging with an inner face of the press fitting hole 57 are also provided integrally with press fitting piece 47c of the second magnetism-collecting terminal 47.

Furthermore, the press fitting holes 56 and 57 are formed so as to have a rectangular cross-section; ribs 60 and 61 are projectingly provided, among inner faces of the press fitting holes 56 and 57, on one of two faces sandwiching the press fitting pieces 46c and 47c from opposite sides in the plate thickness direction so as to extend along the press fitting direction 50, the ribs 60 and 61 pressing the press fitting pieces 46c and 47c against the other of the two faces.

The press fitting pieces 46c and 47c of the first and second magnetism-collecting terminals 46 and 47 are press fitted into the press fitting holes 56 and 57 by being pushed in the press fitting direction 50 by means of a press fitting jig 64 as shown in FIG. 11, and the press fitting pieces 46c and 47c are provided with bent parts 65 and 66 opposing the press fitting direction 50 while being pushed by the press fitting jig 64.

That is, as shown in FIG. 11(a), after parts of the first and second magnetism-collecting terminals 46 and 47 are inserted into the case main portion 45a, as shown in FIG. 11(b) the press fitting jig 64 is abutted against the bent parts 65 and 66 so as to push in the press fitting direction 50, thus press fitting the press fitting pieces 46c and 47c into the press fitting holes 56 and 57 and thereby fixing the first and second magnetism-collecting terminals 46 and 47 to the case 45.

Moreover, provided in the case main portion 45a are guide recess parts 67 and 68 guiding the guide pieces 46d and 47d of the first and second magnetism-collecting terminals 46 and 47. The first and second magnetism-collecting terminals 46 and 47 are reliably guided along the press fitting direction 50 when they are pushed by the press fitting jig 64. Moreover, the guide pieces 46d and 47d are connectedly provided at opposite ends in the peripheral direction of the arc plate portions 46a and 47a of the first and second magnetism-collecting terminals 46 and 47, opposite end parts in the peripheral direction of the arc plate portions 46a and 47a are therefore supported by the case main portion 45a, and it is possible to prevent the arc plate portions 46a and 47a from warping.

Furthermore, after the first and second magnetism-collecting terminals 46 and 47 are press fitted into and fixed to the case 45, the interiors of the press fitting holes 56 and 57 are filled with an adhesive, and the interior of the case main portion 45a is filled with a potting material 69 as shown in FIG. 1.

The operation of the embodiment is now explained. Since the first and second joining faces 31 and 32, to which the first and second magnetic yokes 29 and 30 are adhered, are provided on the yoke holder 27 fixed to the second shaft 16 coaxially linked to the first shaft 15 via the torsion bar 17, and the recess parts 35 and 36, in which the adhesives 33 and 34 can accumulate, are formed in the first and second joining faces 31 and 32, it is possible, by accumulating adhesive in the recess parts 35 and 36, to reliably adhere the first and second magnetic yokes 29 and 30 to the yoke holder 27.

Furthermore, the yoke holder 27 is formed so as to have the second cylindrical portion 27b surrounding the ring-shaped magnet 23 fixed to the first shaft 15, and the first and second magnetic yokes 29 and 30 are fixed to the yoke holder 27 while each having the plurality of claw portions 29a and 30a opposing the magnet 23 on the inside of the second cylindrical portion 27b. Since the pluralities of swaging pieces 29c and 30c swaged on the outer periphery of the second cylindrical portion 27b are provided on the first and second magnetic yokes 29 and 30 respectively, and the swaging pieces 29c and 30c are disposed at positions where they overlap the specific claw portions 29a and 30a selected from the plurality of claw portions 29a and 30a in the radial direction of the second cylindrical portion 27b and are formed so as to have a smaller width than that of the claw portions 29a and 30a, it is possible, by receiving the claw portions 29a and 30a on the inner peripheral side of the yoke holder 27 by means of the receiving tool 39 when swaging the swaging pieces 29c and 30c, to prevent the claw portions 29a and 30a from deforming.

Furthermore, since the swaging pieces 29c and 30c are disposed so that the center position along the peripheral direction of the second cylindrical portion 27b coincides with the specific claw portions 29a and 30a, it is possible to minimize the stress acting on a portion, free from the claw portions 29a and 30a in the peripheral direction, of the magnetic yokes 29 and 30 when carrying out swaging, thus preventing the portion from deforming.

Moreover, since the claw portions 29a and 30a of the first and second magnetic yokes 29 and 30 are disposed in turn in the peripheral direction of the second cylindrical portion 27b, and the claw portions 29a and 30a adjacent to each other and forming a pair in the peripheral direction of the second cylindrical portion 27b are disposed at a position where they can be swaged simultaneously by means of the same swaging blade 40, it is possible to enhance the productivity. Furthermore, in this embodiment, swaging is carried out simultaneously from four directions by means of the swaging device having the swaging blades 40 disposed at four locations equally spaced in the peripheral direction of the second cylindrical portion 27b so as to correspond to the four pairs of swaging pieces 29c and 30c, thus enabling the productivity to be further enhanced.

Moreover, the sensor part 20 detecting a difference in rotational phase between the first shaft 15 and the second shaft 16 has the first and second magnetism-collecting terminals 46 and 47 press fitted into the case 45, which is present at a fixed position, and the Hall IC 48 disposed between the magnetism-collecting terminals 46 and 47. Since the pair of press fitting pieces 46c and 47c having the bent parts 65 and 66 opposing the press fitting direction 50 so as to be pushed by means of the press fitting jig 64 are provided on the first and second magnetism-collecting terminals 46 and 47 respectively, it is possible to prevent the first and second magnetism-collecting terminals 46 and 47 from deforming when carrying out press fitting by means of the press fitting jig 64.

Furthermore, since the case 45 is formed from a synthetic resin while having the press fitting holes 56 and 57 into which the press fitting pieces 46c and 47c are press fitted, and the plurality of engagement claws 58 engaging with the inner faces of the press fitting holes 56 and 57 are provided integrally with the press fitting pieces 46c and 47c of the first and second magnetism-collecting terminals 46 and 47, which are made of a metal, it is possible to reliably fix the first and second magnetism-collecting terminals 46 and 47 to the case 45 in a state in which the press fitting pieces 46c and 47c are press fitted into the press fitting holes 56 and 57.

Moreover, since the ribs 60 and 61 pushing the press fitting pieces 46c and 47c against the other of the two faces are projectingly provided, among the inner faces of the press fitting holes 56 and 57 having a rectangular cross section, on the one of the two faces sandwiching the press fitting pieces 46c and 47c from opposite sides in the plate thickness direction so as to extend in the direction along the press fitting direction 50, it is possible to reliably fix the first and second magnetism-collecting terminals 46 and 47 to the case 45 while eliminating rattling of the press fitting pieces 46c and 47c within the press fitting holes 56 and 57.

Furthermore, the ring-shaped magnet 23 surrounding the magnet holder 22 is adhered to the outer periphery of the cylindrical magnet holder 22 fixed to the first shaft 15. Since the flange portion 22a protruding radially outward from one end part of the magnet holder 22 is provided integrally with the magnet holder 22 so as to have one end part of the magnet 23 abutting against the flange portion 22a, and the positioning projection 23a projectingly provided on the one end part of the magnet 23 is engaged with the positioning recess part 24 formed in the flange portion 22a, the peripheral direction of the magnet 23 is fixedly determined with respect to the magnet holder 22, and since the cut-and-raise piece 22b capable of abutting against the magnet 23 from the side opposite to the flange portion 22a is formed in the magnet holder 22, the position in the axial direction of the magnet 23 with respect to the magnet holder 22 is fixedly determined. Therefore, even when a state in which the magnet 23 is adhered to the outer periphery of the magnet holder 22 is released, it is possible, by maintaining a fixed position in the peripheral direction and the axial direction of the magnet 23 with respect to the magnet holder 22, to reliably fix the magnet 23 to the magnet holder 22.

An embodiment of the present invention is explained above, but the present invention is not limited to the above embodiment and may be modified in a variety of ways as long as the modifications do not depart from the spirit and scope thereof.

The invention claimed is:

1. A torque detection device comprising a multipolar magnet that is formed into a ring shape and fixed to a first shaft, a yoke holder that is formed so as to be fixed to a second shaft coaxially linked to the first shaft via a torsion bar and have a cylindrical portion surrounding the magnet, a pair of magnetic yokes that each have a plurality of claw portions opposing the magnet on an inner side of the cylindrical portion and are fixed to the yoke holder, and a sensor part that detects a difference in rotational phase between the first shaft and the second shaft, wherein the pair of magnetic yokes are each provided with a plurality of swaging pieces swaged on an outer periphery of the cylindrical portion, the swaging piece being disposed at a position that overlaps in a radial direction of the cylindrical portion a specific claw portion selected from the plurality of claw portions and being formed so as to have a smaller width than a width of the claw portion.

2. The torque detection device according to claim 1, wherein the swaging piece is disposed so as to make the center position along a peripheral direction of the cylindrical portion coincide with the specific claw portion.

3. The torque detection device according to claim 1, wherein the claw portions of the pair of magnetic yokes are disposed in turn in the peripheral direction of the cylindrical portion, and the claw portions that are adjacent to each other and form a pair in the peripheral direction of the cylindrical portion are disposed at positions where the claw portions can be swaged simultaneously by means of the same swaging blade.

4. The torque detection device according to claim 2, wherein the claw portions of the pair of magnetic yokes are disposed in turn in the peripheral direction of the cylindrical portion, and the claw portions that are adjacent to each other and form a pair in the peripheral direction of the cylindrical portion are disposed at positions where the claw portions can be swaged simultaneously by means of the same swaging blade.

* * * * *